United States Patent
Irie et al.

(10) Patent No.: US 11,794,807 B2
(45) Date of Patent: Oct. 24, 2023

(54) STEERING CONTROL APPARATUS

(71) Applicant: TOYOTA JIDOSHA KABUSHIKI KAISHA, Toyota (JP)

(72) Inventors: Ryo Irie, Okazaki (JP); Yoji Kunihiro, Susono (JP); Yutaka Aoki, Miyoshi (JP); Yoshio Kudo, Machida-shi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 121 days.

(21) Appl. No.: 17/308,497

(22) Filed: May 5, 2021

(65) Prior Publication Data

US 2021/0253164 A1 Aug. 19, 2021

Related U.S. Application Data

(63) Continuation of application No. 15/890,884, filed on Feb. 7, 2018, now Pat. No. 11,027,777.

(30) Foreign Application Priority Data

Mar. 31, 2017 (JP) .................................. 2017-071639

(51) Int. Cl.
*B62D 6/00* (2006.01)
*B62D 6/08* (2006.01)
(Continued)

(52) U.S. Cl.
CPC ............. *B62D 6/008* (2013.01); *B62D 5/046* (2013.01); *B62D 6/005* (2013.01); *B62D 6/007* (2013.01); *B62D 6/08* (2013.01); *B62D 15/025* (2013.01)

(58) Field of Classification Search
CPC ...................................................... B62D 6/008
See application file for complete search history.

(56) References Cited

U.S. PATENT DOCUMENTS 6,050,359 A  4/2000 Mouri et al.
6,278,918 B1  8/2001 Dickson et al.
(Continued)

FOREIGN PATENT DOCUMENTS

DE  19808100 A1  10/1998
DE  102016209966 A1  12/2016
(Continued)

OTHER PUBLICATIONS

The U.S. Appl. No. 15/838,999, filed Dec. 12, 2017 in the name of Yoshio Kudo et. al.

*Primary Examiner* — Jean Paul Cass
(74) *Attorney, Agent, or Firm* — Oliff PLC (57) ABSTRACT

The steering control apparatus determines whether or not a deviation degree of a current traveling route of a vehicle with respect to a target traveling route is equal to or more than a predetermined threshold, when steering control is switched from manual steering control to automatic steering control. In the automatic steering control, a command steering angle is calculated so that a difference between a real traveling route of the vehicle and the target traveling route is eliminated. However, when the deviation degree is equal to or more than the predetermined threshold, the steering control apparatus recalculates the command steering angle used in the command steering angle tracking control based on a steering angle at the time of starting the automatic steering control and the command steering angle so that a real steering angle after switching to the automatic steering control changes gradually to the command steering angle.

18 Claims, 6 Drawing Sheets

(51) Int. Cl.
*B62D 5/04* (2006.01)
*B62D 15/02* (2006.01)

(56) References Cited

U.S. PATENT DOCUMENTS

| | | |
|---|---|---|
| 6,285,930 B1 | 9/2001 | Dickson et al. |
| 6,385,515 B1 | 5/2002 | Dickson et al. |
| 6,490,539 B1 | 12/2002 | Dickson et al. |
| 6,686,951 B1 | 2/2004 | Dickson et al. |
| 8,972,087 B2 | 3/2015 | Takeuchi et al. |
| 9,855,894 B1 | 1/2018 | Khorasani |
| 2002/0007236 A1 | 1/2002 | Sadano et al. |
| 2002/0017415 A1 | 2/2002 | Campbell et al. |
| 2002/0106108 A1 | 8/2002 | Benson et al. |
| 2003/0056753 A1 | 3/2003 | Fukushima et al. |
| 2006/0089770 A1 | 4/2006 | Ito |
| 2007/0021889 A1 | 1/2007 | Tsuchiya |
| 2007/0185594 A1 | 8/2007 | Iwazaki et al. |
| 2009/0099729 A1 | 4/2009 | Bolio et al. |
| 2010/0106356 A1* | 4/2010 | Trepagnier ............ G05D 1/0248 701/25 |
| 2012/0053789 A1 | 3/2012 | Noumura et al. |
| 2012/0062375 A1 | 3/2012 | Takeuchi et al. |
| 2012/0109452 A1* | 5/2012 | Autran ................. H04L 12/413 29/592.1 |
| 2012/0268325 A1 | 10/2012 | Hansen |
| 2012/0283907 A1* | 11/2012 | Lee .................... B60T 8/17557 701/32.9 |
| 2012/0283911 A1* | 11/2012 | Lee ....................... B60W 30/12 701/41 |
| 2013/0166121 A1 | 6/2013 | Takeuchi et al. |
| 2013/0184934 A1 | 7/2013 | Takeuchi et al. |
| 2013/0253793 A1 | 9/2013 | Lee et al. |
| 2016/0014252 A1 | 1/2016 | Biderman et al. |
| 2016/0139598 A1 | 5/2016 | Ichikawa et al. |
| 2016/0262094 A1 | 9/2016 | Khay-Ibbat et al. |
| 2016/0280258 A1 | 9/2016 | Lavoie et al. |
| 2016/0280267 A1 | 9/2016 | Lavoie et al. |
| 2016/0303485 A1 | 10/2016 | Kawamura et al. |
| 2016/0318512 A1* | 11/2016 | Yamaoka .............. B60W 30/12 |
| 2016/0362116 A1 | 12/2016 | Otsuka |
| 2017/0183025 A1 | 6/2017 | Okazaki et al. |
| 2017/0297614 A1 | 10/2017 | Minaki et al. |
| 2017/0368936 A1* | 12/2017 | Kojima ................. B60W 40/09 |
| 2018/0196436 A1* | 7/2018 | Gupta ..................... G01S 19/38 |
| 2018/0281849 A1 | 10/2018 | Irie et al. |

FOREIGN PATENT DOCUMENTS

| | | | |
|---|---|---|---|
| JP | 2002-019634 A | | 1/2002 |
| JP | 2002-354576 A | | 12/2002 |
| JP | 2003-097339 A | | 4/2003 |
| JP | 2006-117181 A | | 5/2006 |
| JP | 2007-030612 A | | 2/2007 |
| JP | 2007062654 A | * | 3/2007 |
| JP | 2007062654 A | | 3/2007 |
| JP | 2007-163564 A | | 6/2007 |
| JP | 2007145227 A | * | 6/2007 |
| JP | 2007145227 A | | 6/2007 |
| JP | 2012-051441 A | | 3/2012 |
| JP | 2016-99713 A | | 5/2016 |

* cited by examiner

STEERING CONTROL APPARATUS

CROSS-REFERENCE TO RELATED APPLICATION

This is a Continuation of application Ser. No. 15/890,884 filed Feb. 7, 2018 (now U.S. Pat. No. 11,027,777), which in turn claims priority to Japanese Patent Application No. 2017-071639, filed on Mar. 31, 2017, which is incorporated by reference herein in its entirety.

BACKGROUND

Field

The present disclosure relates to a steering control apparatus suitably used for an autonomous driving vehicle, and more particularly, to a steering control apparatus that can automatically operate a steering mechanism by a motor to make a vehicle travel along a target traveling route.

Background Art

A steering control apparatus is researched and developed that is capable of switching steering control between manual steering control to make a driver operate a steering mechanism and automatic steering control to operate the steering mechanism automatically by a motor. In the automatic steering control, tracking control to control a vehicle to track a target traveling route is performed. When switching from the manual steering control to the automatic steering control, automatic steering to return the vehicle on the target traveling route is performed. If the vehicle greatly deviates from the target traveling route in the manual steering control, sudden steering to return the vehicle on the traveling route is performed at the time of switching to the automatic steering control, and thereby, disorder of vehicle behavior and steering behavior can be produced. Note that the vehicle behavior means, for example, variation in lateral acceleration or variation in yaw rate. The steering behavior means, for example, variation in steering angle, variation in steering angle velocity, or variation in steering angle angular velocity.

For a method to suppress the disorder of the vehicle behavior and the steering behavior, lowering a control gain of the tracking control is exemplified. For example, JP 2007-030612A discloses a lane keeping support control device using an electric power steering apparatus. The lane keeping support control device calculates motor torque for the vehicle to travel on a predetermined position in a traveling lane using PID control based on a deviation between an offset of the vehicle to the traveling route and a target offset and a deviation between a yaw angle and a target yaw angle.

The PID control or PI control can be also applied to the tracking control concerning the automatic steering control. In this case, the traveling route of the vehicle gradually converges to the target traveling route by lowering the control gain of the PID control or the PI control. Thereby, the disorder of the vehicle behavior and the steering behavior is suppressed.

However, lowering the control gain of the tracking control decreases a correction amount of a manipulated variable with respect to the disturbance that acts on the vehicle. That is, robustness to the disturbance decreases. Therefore, when the disturbance such as crosswinds and the like acts on the vehicle, the influence of the disturbance may cause the disorder of the vehicle behavior and the steering behavior and may cause the deviation of the vehicle from the target traveling route.

SUMMARY

The present disclosure is made in the light of the problem as described above, and has an object to provide a steering control apparatus that can control a vehicle to track a target traveling route smoothly while suppressing the influence of disturbance after switching from manual steering control to automatic steering control.

A steering control apparatus according to the present disclosure is one that is capable of switching steering control between manual steering control to make a driver operate steering mechanism and automatic steering control to operate the steering mechanism automatically by a motor. The steering control apparatus according to the present disclosure is programmed to acquire a target traveling route, calculate a command steering angle so that a difference between a real traveling route of the vehicle and the target traveling route is eliminated, and perform command steering angle tracking control to drive the motor so that a real steering angle tracks the command steering angle, when the automatic steering control is selected. Furthermore, the steering control apparatus according to the present disclosure is programmed to: determine whether or not a deviation degree of a current traveling route of the vehicle with respect to the target traveling route is equal to or more than a predetermined threshold, when the steering control is switched from the manual steering control to the automatic steering control; and recalculate the command steering angle used in the command steering angle tracking control based on a steering angle at the time of starting the automatic steering control and the command steering angle so that a real steering angle after switching to the automatic steering control changes gradually into the command steering angle, when the deviation degree is equal to or more than the predetermined threshold.

According to the above described configuration, even if the traveling route of the vehicle at the time of switching from the manual steering control to the automatic steering control is away from the target traveling route, sudden steering to make the vehicle return on the target traveling route is not performed. The command steering angle is calculated to eliminate the difference between the real traveling route and the target traveling route. However, real steering angle after switching to the automatic steering control is gradually changed into the command steering angle. Therefore, the traveling route of the vehicle converges gradually to the target traveling route, and thereby, disorder of vehicle behavior and steering behavior is suppressed. Also, when disturbance acts to the vehicle, the influence of the disturbance to the vehicle behavior and the steering behavior is suppressed by action of the command steering angle tracking control because technique such as lowering a control gain of the command steering angle tracking control is not adopted.

For a method to recalculate the command steering angle used in the command steering angle tracking control, for example, a method to execute a filtering process or a rate limiter process to a difference between a steering angle at the time of starting the automatic steering control and the command steering angle may be adopted. Also, the command steering angle used in the command steering angle tracking control may be recalculated to match the real traveling route of the vehicle with the target traveling route until a predetermined time passes from the starting time of the automatic steering control while keeping the vehicle behavior and the steering behavior within an allowable range.

When the command steering angle used in the command steering angle tracking control is recalculated, a gain of the command steering angle tracking control may be adjusted to raise trackability of the real steering angle with respect to the command steering angle. Also, while the command steering angle used in the command steering angle tracking control is recalculated, an integral value included in an integral term of the command steering angle tracking control may be stopped updating or may be reset.

When switching the steering control from the manual steering control to the automatic steering control is requested, it may be determined whether or not the deviation degree is equal to or more than a predetermined upper limit. In this case, when the deviation degree is equal to or more than the predetermined upper limit, the switching to the automatic steering control may be canceled and the manual steering control may be continued. When the current traveling route of the vehicle extremely deviates from the target traveling route, it may be difficult to gradually change the real steering angle after switching to the automatic steering control into the command steering angle. In such a case, disorder of the vehicle behavior and the steering behavior is prevented by not forcibly switching to the automatic steering control.

According to the steering control apparatus according to the present disclosure, the vehicle is controlled to track the target traveling route smoothly while suppressing the influence of disturbance after switching from the manual steering control to the automatic steering control.

DETAILED DESCRIPTION

Hereunder, an embodiment of the present disclosure will be described with reference to the drawings. Note that when the numerals of numbers, quantities, amounts, ranges and the like of respective elements are mentioned in the embodiment shown as follows, the present disclosure is not limited to the mentioned numerals unless specially explicitly described otherwise, or unless the disclosure is explicitly specified by the numerals theoretically. Furthermore, structures that are described in the embodiment shown as follows are not always indispensable to the disclosure unless specially explicitly shown otherwise, or unless the disclosure is explicitly specified by the structures theoretically.

1. Configuration of Vehicle Steering Apparatus

Figure 1:
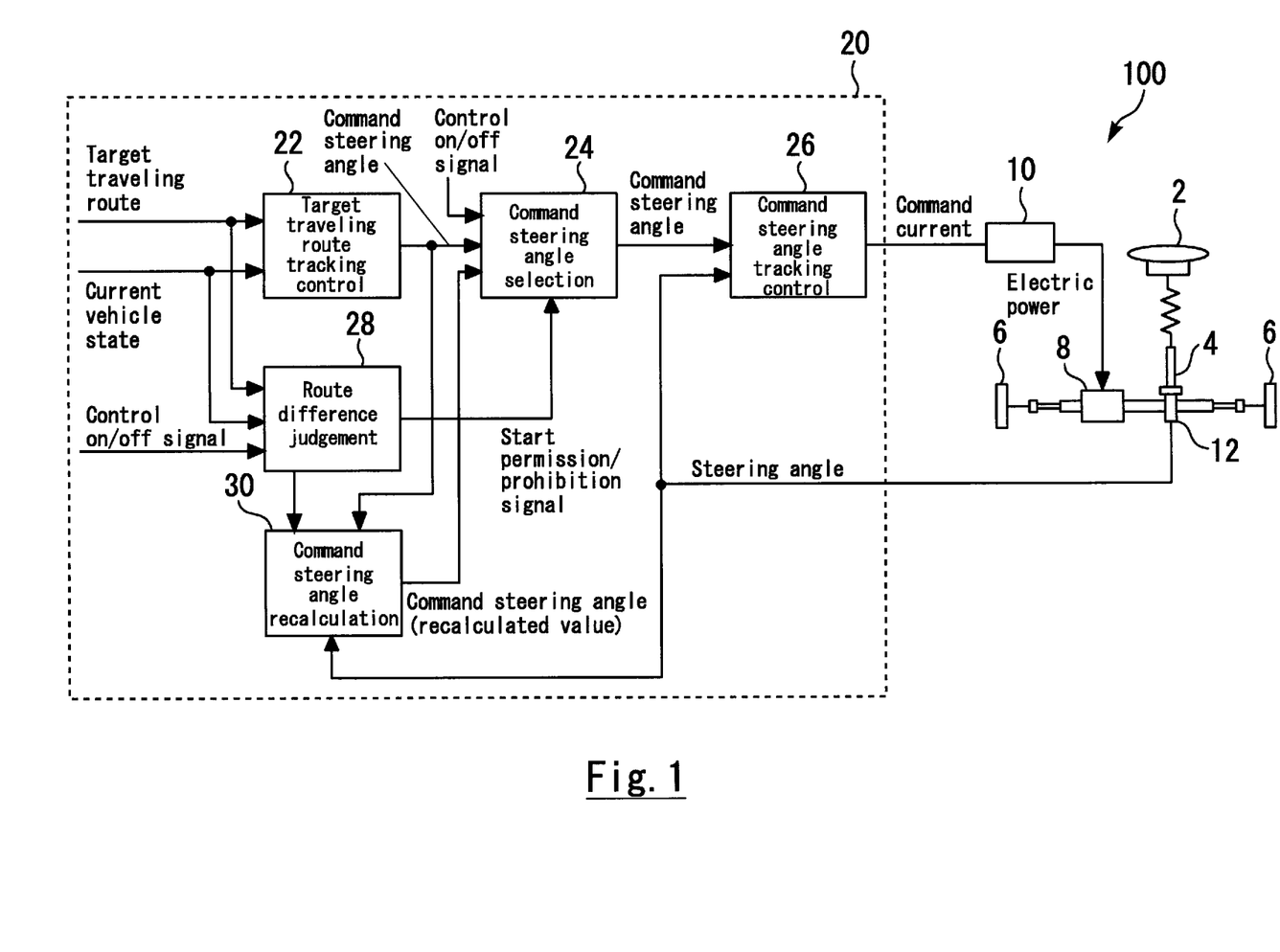
FIG. 1 is a view illustrating a configuration of a vehicle steering apparatus according to an embodiment.

A vehicle steering apparatus according to the present embodiment is one mounted on an autonomous driving vehicle. The autonomous driving vehicle according to the present embodiment can switch drive between manual drive by a driver and automatic drive by a computer. In the manual drive, manual steering control that makes the driver operate a steering mechanism is performed. In the automatic drive, automatic steering control that automatically operates the steering mechanism by a motor is performed. FIG. 1 is a view illustrating a configuration of the vehicle steering apparatus according to the present embodiment. First, the structural system of the vehicle steering apparatus 100 will be described using FIG. 1.

The vehicle steering apparatus 100 comprises a steering mechanism 4 coupling a steering wheel 2 for operation by the driver and right and left front wheels 6, 6 that are steered wheels. The steering mechanism 4 comprises a steering column shaft into which rotation operation of the steering wheel 2 is input, a gear mechanism to increase operation force generated by the rotation operation input into the steering column shaft, and a link mechanism that transmits the operation force transmitted from the gear mechanism to the right and left front wheels 6, 6. There is no limitation on a specific configuration of each mechanism that constructs the steering mechanism 4.

The vehicle steering apparatus 100 comprises a motor 8 that receives supply of electric power to generate torque and gives generated torque to the steering mechanism 4. In FIG. 1, the vehicle steering apparatus 100 is configured as a rack assist type electric power steering apparatus that transmits torque of the motor 8 to the rack of the gear mechanism. However, in the vehicle steering apparatus 100, a column assist type or a pinion assist type may be adopted as the type of the electric power steering apparatus. The motor 8 is driven by receiving supply of electric power from a motor driver 10

Next, the control system of the vehicle steering apparatus 100 will be described.

The vehicle steering apparatus 100 comprises a plurality of sensors to measure a physical quantity related to the steering control. A steering angle sensor 12 measuring a steering angle is attached to the steering mechanism 4. The steering angle sensor 12 measures a rotation angle of a pinion as the steering angle. The vehicle steering apparatus 100 comprises a sensor (not shown) to acquire information on traveling conditions of the vehicle such as a speed sensor, an acceleration sensor, and a yaw rate sensor in addition to the steering angle sensor 12. Furthermore, the vehicle steering apparatus 100 comprises a GPS equipment (not shown) to acquire location information of the vehicle and a sensor (not shown) to acquire information on circumstances outside of the vehicle such as a camera, a radar, and a LIDAR. However, such various sensors need not necessarily be an exclusive article for the steering control by the vehicle steering apparatus 100, and may be used in common with other equipment.

The vehicle steering apparatus 100 comprises a steering control apparatus 20 that gives a command current (or a command torque) to the motor driver 10. The steering control apparatus 20 is configured to control steering torque that the steering mechanism 4 is given from the motor 8 by adjusting the command current given to the motor driver 10.

The sensors to measure physical quantity related to the steering control are connected to the steering control apparatus 20 directly or through a communication network constructed in the vehicle. The steering control apparatus 20 is an ECU (Electronic Control Unit) having at least one processor and at least one memory. Various programs and various data including maps for the steering control are stored in the memory. When programs stored in the memory are executed by the processor, various functions concerning the steering control are implemented to the steering control apparatus 20.

2. Overview of Function of Steering Control Apparatus

The steering control performed by the steering control apparatus 20 includes the manual steering control to make the driver operate the steering mechanism 4 through the steering wheel 2 and the automatic steering control to operate the steering mechanism 4 automatically by the motor 8. Switching of the steering control between the manual steering control and the automatic steering control is performed through a switch operation by the driver basically. However, when it becomes impossible to continue the automatic steering control, switching from the automatic steering control to the manual steering control may be performed by the steering control apparatus 20. Also, when a starting condition of the automatic steering control is not satisfied, switching from the manual steering control to the automatic steering control may be refused by the steering control apparatus 20.

The manual steering control by the steering control apparatus 20 includes steering assist control to assist the driver in a steering operation by the torque generated from the motor 8. Also, the manual steering control includes steering wheel return control to assist the driver in a steering operation for returning the steering wheel. Furthermore, the manual steering control includes lane keeping support control to assist the driver in a steering operation so as to make the vehicle travel along a vicinity of the center of the own lane. Note that, about these control, the details are not described in the present specification anymore because control methods regarding these control are suggested in a lot of publicly known literatures.

In the automatic steering control by the steering control apparatus 20, a target traveling route is acquired from a higher control apparatus, and electric power to supply to the motor 8 is controlled so that a difference between a real traveling route of the vehicle and the target traveling route is eliminated. In FIG. 1, functions of the steering control apparatus 20 related to the automatic steering control is illustrated with blocks. As illustrated with blocks in FIG. 1, the steering control apparatus 20 comprises a target traveling route tracking control part 22, a command steering angle selection part 24, a command steering angle tracking control part 26, a route difference judgement part 28 and a command steering angle recalculation part 30. These parts 22, 24, 26, 28, 30 that the steering control apparatus 20 comprises correspond to a program or part of a program that is stored in the memory of the steering control apparatus 20. The functions of these parts 22, 24, 26, 28, 30 are realized in the steering control apparatus 20 by the program being read from the memory and being performed with the processor. The function of each part 22, 24, 26, 28, 30 is described sequentially as follows from the target traveling route tracking control part 22.

3. Details of Function of Steering Control Apparatus

The target traveling route tracking control part 22 (hereafter, it is simply referred to as a first tracking control part 22) acquires the target traveling route from the higher control apparatus and acquires the information on a current vehicle state from the vehicle speed sensor, the acceleration sensor, the yaw rate sensor, the camera, the GPS equipment, and the like. And, based on the target traveling route and the current vehicle state, the first tracking control part 22 calculates a steering angle necessary to make the vehicle track the target traveling route, that is, a steering angle to eliminate a difference between the target traveling route and the real traveling route of the vehicle, and outputs the steering angle as a command steering angle. In the first tracking control part 22, the command steering angle is calculated to make the real traveling route converge to the target traveling route with a constant response. Note that, about the calculation of the command steering angle to make the vehicle track the target traveling route, the method thereof has been already suggested in a lot of well-known literatures. Therefore, the details are not described in the present specification.

The command steering angle selection part 24 (hereafter, it is simply referred to as a selection part 24) takes the command steering angle calculated by the first tracking control part 22 and the command steering angle recalculated by the command steering angle recalculation part 30 described below. Also, the selection part 24 receives a control on/off signal generated depending on the switch operation by the driver and receives a start permission/prohibition signal provided from the route difference judgement part 28 described below. The control on/off signal is a signal that becomes ON when the driver performs the switch operation to switch the steering control from the manual steering control to the automatic steering control and becomes OFF when the driver performs the switch operation to switch the steering control from the automatic steering control to the manual steering control. The start permission/prohibition signal is a signal including information on whether starting the automatic steering control is permitted or prohibited.

When the control on/off signal is ON, the selection part 24 outputs the command steering angle that is acquired from the first tracking control part 22 or the command steering angle recalculation part 30. However, when the start permission/prohibition signal is in a prohibition state, the selection part 24 cancels outputting the command steering angle. The command steering angle output from the selection part 24 is basically the command steering angle calculated by the first tracking control part 22 (hereafter, it may be referred to as an original value of the command steering angle). Only when the command steering angle recalculated by the command steering angle recalculation part 30 is taken, the selection part 24 outputs the command steering angle that is recalculated (hereafter, it may be referred to as a recalculated value of the command steering angle).

The command steering angle tracking control part 26 (hereafter, it is simply referred to as a second tracking control part 26) takes the command steering angle from the selection part 24 and takes a real steering angle from the steering angle sensor 12. And the second tracking control part 26 performs command steering angle tracking control based on the command steering angle and the real steering angle. The command steering angle tracking control is control to drive the motor 8 so as to make the real steering angle track the command steering angle, and comprises feed-forward control and feedback control. The function of the second tracking control part 26 is described in detail later.

The route difference judgement part 28 (hereafter, it is simply referred to as a judgement part 28) acquires the target traveling route and the current vehicle state. Also, the control on/off signal generated depending on the switch operation by the driver is input into the judgement part 28. When a request of switching of the steering control from the manual steering control to the automatic steering control is input from driver, the control on/off signal is switched from OFF to ON. At that time, the judgement part 28 calculates a route difference between the target traveling route and the current traveling route of the vehicle, and performs a judgment whether or not the route difference is larger than a threshold. The route difference described in the present specification refers to a deviation degree of the current traveling route of the vehicle with respect to the target traveling route. The subject matter of the deviation degree will be described using FIG. 2.

Figure 2:
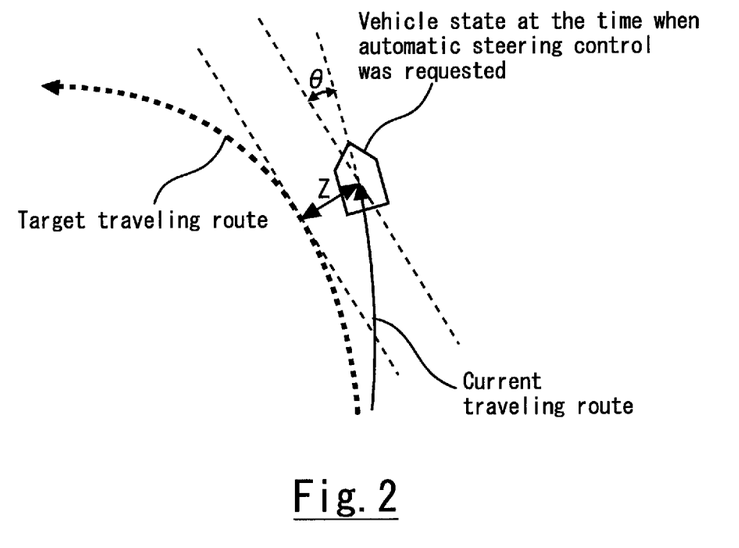
FIG. 2 is a view describing a function of a route difference judgement part of a steering control apparatus.

In FIG. 2, the current traveling route and the vehicle state at the time when starting the automatic steering control was requested are drawn with solid lines, and the target traveling route is drawn with a dotted line. A parameter indicating the deviation degree is, for example, a distance (minimum distance) Z from the vehicle to the target traveling route. Also, the parameter may be a deviation angle θ between a traveling direction of the vehicle and a tangent at a point where a distance from the vehicle to the target traveling route is minimized. The magnitude of the distance Z represents the magnitude of the deviation of the current traveling route from the target traveling route. The magnitude of the deviation angle θ also represents the magnitude of the deviation of the current traveling route from the target traveling route. The judgement part 28 calculates the distance Z and the deviation angle θ based on the target traveling route and the current vehicle state and calculates the deviation degree that is expressed as a function of the distance Z and the deviation angle θ.

Referring back to FIG. 1, explanation on the judgement part 28 is continued. The judgement part 28 has two thresholds to be compared with a calculated route difference as the deviation degree. A first threshold is an upper limit of the route difference where switching from the manual steering control to the automatic steering control is permitted. When the current traveling route of the vehicle extremely deviates from the target traveling route, the disorder of the vehicle behavior and the steering behavior may not be prevented even if the command steering angle is recalculated as described below. The judgement part 28, when the route difference is equal to or more than the first threshold, outputs a signal prohibiting starting the automatic steering control to the selection part 24. When the route difference is smaller than the first threshold, the judgement part 28 outputs a signal permitting starting the automatic steering control to the selection part 24. A second threshold is a threshold to determine whether or not to perform recalculation of the command steering angle described below. The second threshold is smaller than the first threshold. When the route difference is smaller than the first threshold and is equal to or more than the second threshold, the judgement part 28 outputs a signal directing the recalculation of the command steering angle to the command steering angle recalculation part 30.

The command steering angle recalculation part 30 (hereafter, it is simply referred to as a recalculation part 30) takes the real steering angle obtained by the steering angle sensor 12 and the command steering angle calculated by the first tracking control part 22. Also, a signal directing the recalculation of the command steering angle is input into the recalculation part 30 from the judgement part 28. When the recalculation of the command steering angle is directed by the judgement part 28, the recalculation part 30 performs the recalculation of the command steering angle based on the steering angle at the time of starting the automatic steering control and the command steering angle calculated by the first tracking control part 22. The subject matter of the recalculation of the command steering angle will be described using FIG. 3.

Figure 3:
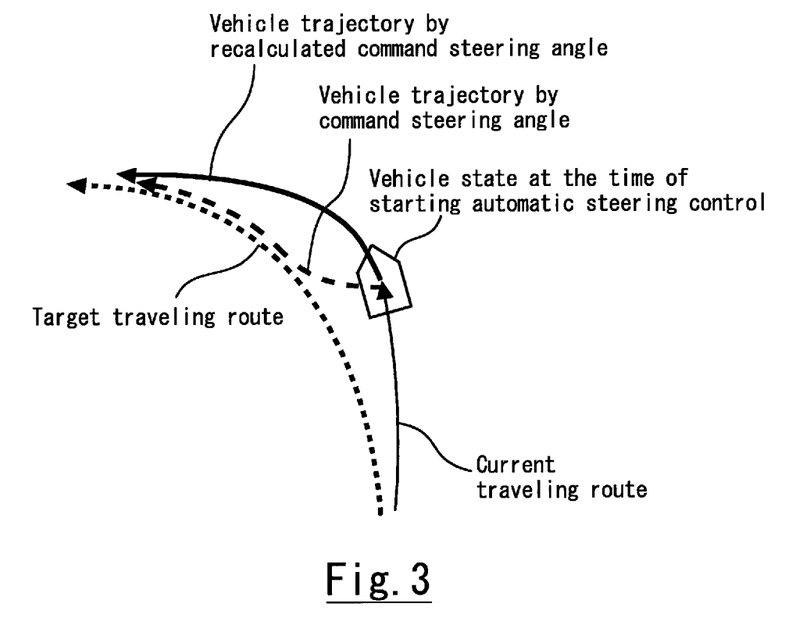
FIG. 3 is a view describing a function of a command steering angle recalculation part of the steering control apparatus.

In FIG. 3, the current traveling route and the vehicle state at the time of starting the automatic steering control are drawn with solid lines, and the target traveling route is drawn with a dotted line. Also, the trajectory of the vehicle at the time when the command steering angle tracking control is performed based on the command steering angle calculated by the first tracking control part 22 is drawn with a dotted line. The first tracking control part 22 calculates the command steering angle so as to make the real traveling route of the vehicle immediately converge to the target traveling route. Therefore, when the route difference (deviation degree) at the time of starting the automatic steering control is large, sudden steering is performed to change a course toward the target traveling route as shown by a dotted line in FIG. 3. Such a sudden steering causes the disorder of the vehicle behavior and the steering behavior.

In FIG. 3, the trajectory of the vehicle at the time when the command steering angle tracking control is performed based on the command steering angle recalculated by the recalculation part 30 is drawn with a solid line. According to the command steering angle recalculated by the recalculation part 30, the attitude of the vehicle does not change greatly before and after the start of the automatic steering control, and the vehicle tracks the target traveling route smoothly. For realizing such a movement of the vehicle, the recalculation part 30 performs the recalculation of the command steering angle so as to gradually change the real steering angle after switching to the automatic steering control into the command steering angle. The embodiment of the recalculation of the command steering angle by the recalculation part 30 will be described using FIG. 4.

Figure 4:
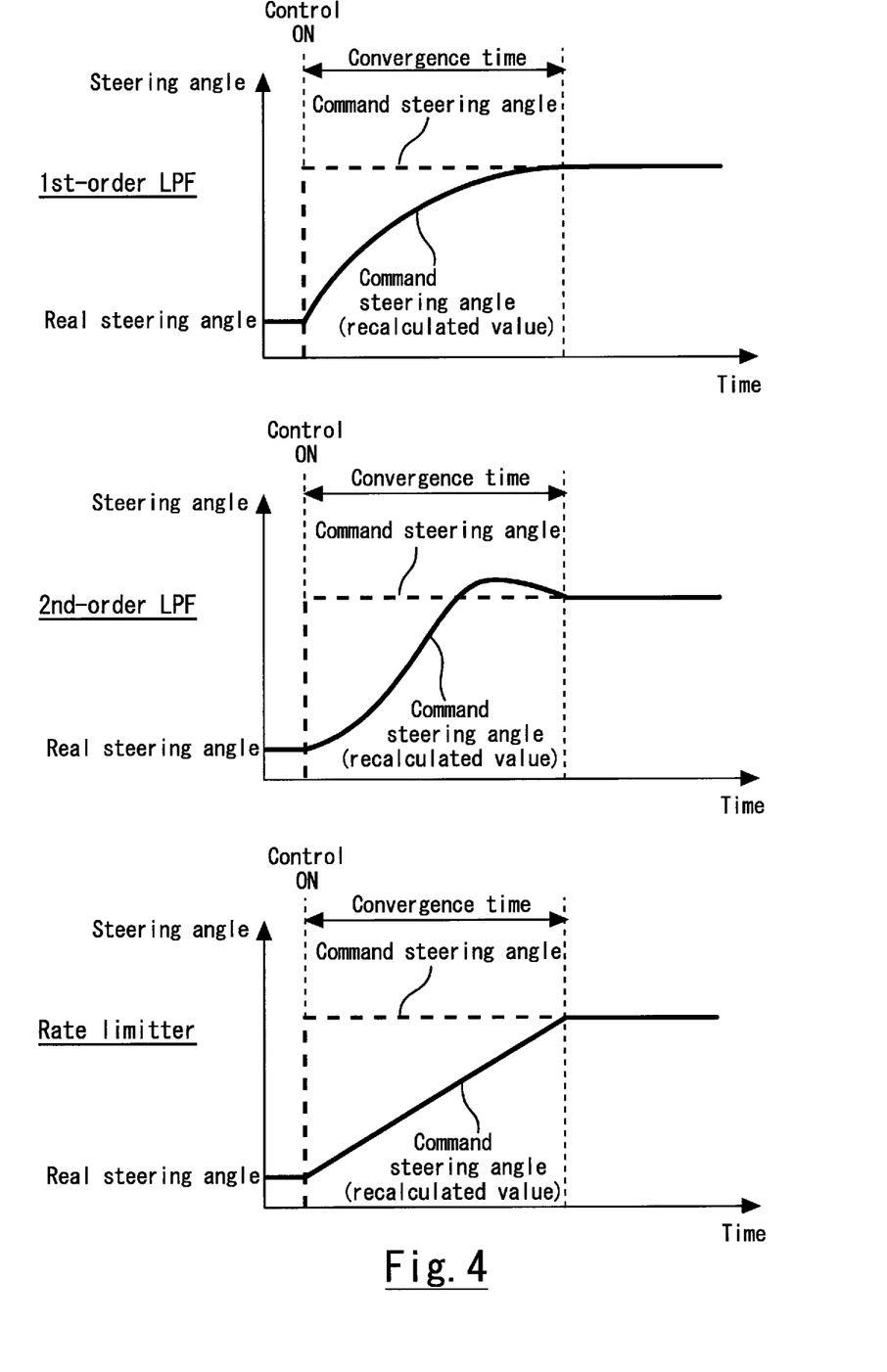
FIG. 4 is a view exemplifying a recalculation method of a command steering angle by the command steering angle recalculation part of the steering control apparatus.

FIG. 4 shows three graphs explaining three computation methods preferred as a method of the recalculation of the command steering angle by the recalculation part 30. The first method is a method using a first-order low-pass filter (1st-order LPF) of which the image is shown in the top graph. By inputting into the 1st-order LPF a difference between the original value of the command steering angle and the real steering angle at the time of starting the automatic steering control, a recalculated value of the command steering angle is obtained. The second method is a method using a second-order low-pass filter (2nd-order LPF) of which the image is shown in the second top graph. By inputting into the 2nd-order LPF a difference between the original value of the command steering angle and the real steering angle at the time of starting the automatic steering control, a recalculated value of the command steering angle is obtained. The third method is a method using a rate limiter of which the image is shown in the bottom graph. By inputting into the rate limiter a difference between the original value of the command steering angle and the real steering angle at the time of starting the automatic steering control, a recalculated value of the command steering angle is obtained. Each of the above exemplified methods provides a recalculated value that gradually changes from the steering angle at the time of starting the automatic steering control to the command steering angle. In addition to the above exemplified methods, a method that lowers a step response like a moving average method can be used as the recalculation method of the command steering angle.

In each of the above exemplified methods, a time period until the recalculated command steering angle converges to the original value can be adjusted arbitrarily. For example, according to the first method and the second method, a convergence time can be adjusted by changing the time constant of the low-pass filter. Specifically, according to the first method, a step response is expressed with a function "1−exp (−t/T)", and a time period required for the value of the function reaching 0.632 is defined as a time constant T of the low-pass filter. The convergence time is adjusted by changing the time constant T according to the first method. According to the third method, the convergence time can be adjusted by changing the maximum changing rate of the output.

A change of the convergence time causes a change of a time period until the traveling route of the vehicle is matched with the target traveling route, and causes a change of the vehicle behavior and the steering behavior just after the start of the automatic steering control. Specifically, when the convergence time is shortened, the time period until the traveling route of the vehicle is matched with the target traveling route is also shortened, but the disorder becomes easy to occur in the vehicle behavior and the steering behavior. On the contrary, when the convergence time is lengthened, the disorder of the vehicle behavior and the steering behavior is suppressed, but long time period is required until the traveling route of the vehicle is matched with the target traveling route.

Therefore, when recalculating the command steering angle, the recalculation part 30 adjusts a parameter (time constant of the filter, and the like) so that the traveling route of the vehicle is matched with the target traveling route until a predetermined time elapses from the start of the automatic steering control, while keeping the vehicle behavior and steering the behavior within an allowable range. For the adjustment of the parameter, the vehicle model simulating a change of the vehicle behavior and the steering behavior with respect to the command steering angle is used.

For example, the vehicle model used for the adjustment of the parameter is expressed by the following equations 1-7. The adjustment of the parameter to determine the convergence time is performed to satisfy the equations 1-2 that represent constraint on the steering behavior and to satisfy the equations 3-7 that represents constraint on the vehicle behavior. Note that, in the following expressions, $\theta$ is the command steering angle, V is the vehicle speed, L is the wheel base, A is the stability factor, $\alpha_y$ is the lateral acceleration, $\gamma$ is the yaw rate, $\delta$ is the front wheel steering angle, and $w_g$ is the steering gear ratio.

$$\frac{d\theta}{dt} < \text{steering angle change threshold} \qquad \text{equation 1}$$

$$\frac{d^2\theta}{dt^2} < \text{steering angle change rate threshold} \qquad \text{equation 2}$$

$$\frac{d\alpha_y}{dt} < \text{lateralacceleration change rate threshold} \qquad \text{equation 3}$$

$$\frac{d\gamma}{dt} < \text{yaw rate change threshold} \qquad \text{equation 4}$$

$$\alpha_y = \frac{1}{1+AV^2}\frac{V^2}{L}\delta \qquad \text{equation 5}$$

$$\gamma = \frac{1}{1+AV^2}\frac{V}{L}\delta \qquad \text{equation 6}$$

$$\theta = w_g\delta \qquad \text{equation 7}$$

The recalculation of the command steering angle by the recalculation part 30 is continued until the recalculated value of the command steering angle converges to the original value. Meanwhile, switching from the manual steering control to the automatic steering control is canceled when the constraint on the steering behavior expressed by the equations 1-2 is not satisfied or when the constraint on the vehicle behavior expressed by the equations 3-7 is not satisfied.

Figure 5:
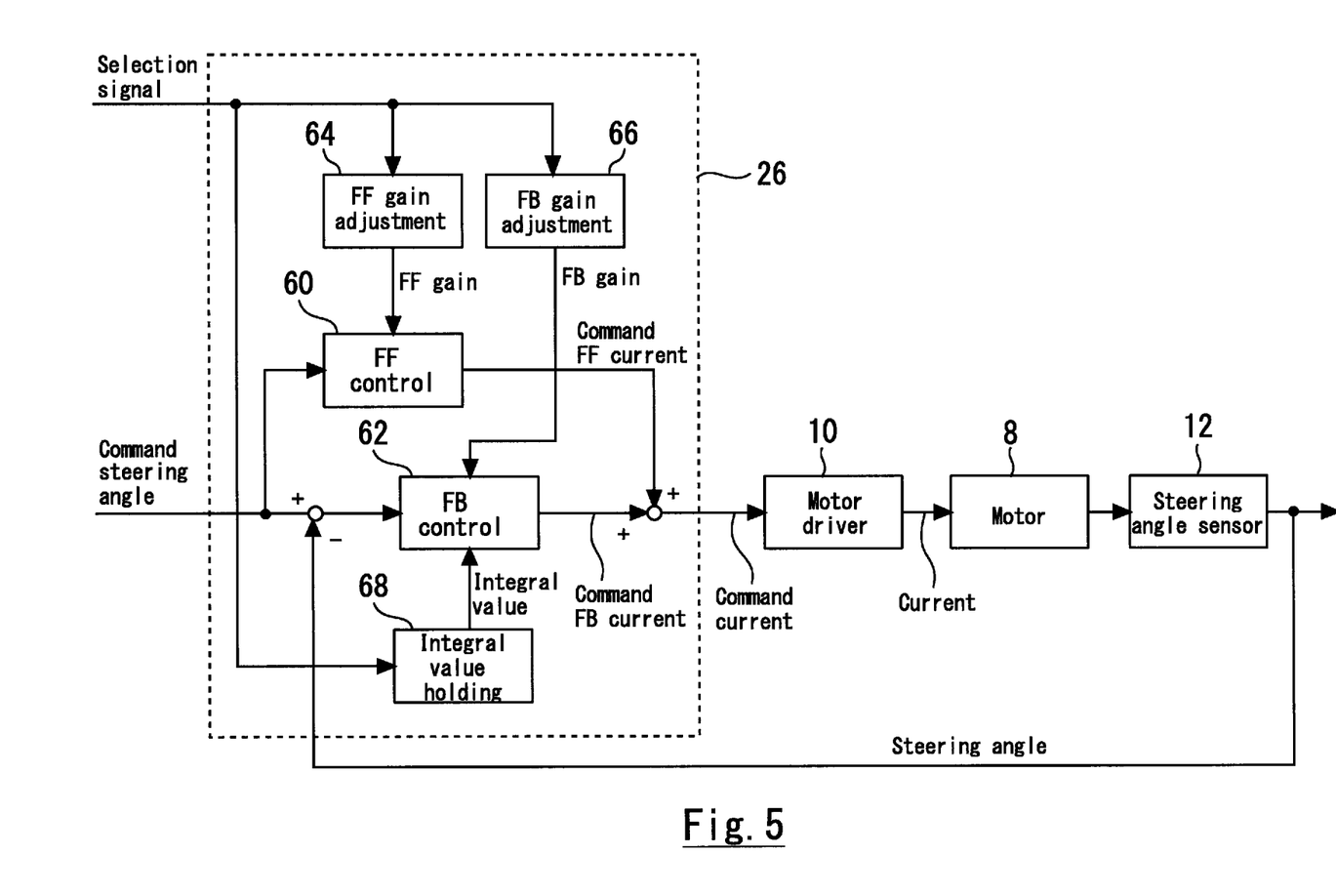
FIG. 5 is a block diagram illustrating a configuration of a command steering angle tracking control part of the steering control apparatus.

As previously described, the recalculated command steering angle is sent to the selection part 24, and then, is sent to the second tracking control part 26 from the selection part 24. Here, a function of the second tracking control part 26 will be described using FIG. 5 in detail. FIG. 5 is a block diagram illustrating a configuration of the second tracking control part 26. The function of the second tracking control part 26 is illustrated with blocks in FIG. 5. As illustrated with blocks in FIG. 5, the second tracking control part 26 comprises a FF control part 60, a FB control part 62, a FF gain adjusting part 64, a FB gain adjusting part 66 and an integral value holding part 68. These parts 60, 62, 64, 66, 68 that the second tracking control part 26 comprises correspond to a program or part of a program that is stored in the memory of the steering control apparatus 20. The functions of these parts 60, 62, 64, 66, 68 are realized in the steering control apparatus 20 by the program being read from the memory and being performed with the processor. The function of each part 60, 62, 64, 66, 68 is described sequentially as follows from the FF control part 60.

When receiving the command steering angle from the selection part 24, the FF control part 60 multiplies it by a gain to convert it into the command current. The command current output from the FF control part 60 is a feedforward term of the command current that is finally given to the motor driver 10 from the second tracking control part 26. Hereafter, it is referred to as a FF command current. Also, the gain used in the FF control part 60 is referred to as a FF gain. The FF gain is a variable gain.

When receiving a difference between the steering angle and the command steering angle that is taken from the selection part 24, the FB control part 62 performs PID control to the difference. The command current provided by the PID control is a feedback term of the command current that is finally given to the motor driver 10 from the second tracking control part 26. Hereafter, it is referred to as a FB command current. Also, each gain of P term, I term, D term of the PID control is collectively referred to as a FB gain. The FB gain is a variable gain.

The FF gain adjusting part 64 and the FB gain adjusting part 66 receive a selection signal from the selection part 24. The selection signal is a signal that is generated when not the original value but the recalculated value is selected as the command steering angle in the selection part 24. When receiving the selection signal, the FF gain adjusting part 64 adjusts the FF gain of the FF control part 60 and the FB gain adjusting part 66 adjusts the FB gain of the FB control part 62. In the adjustment of the FF gain and the FB gain, each value of both the gains is increased than usual to raise trackability of the steering angle with respect to the command steering angle. The adjustment of the FF gain and the FB gain is continued until recalculated value of the command steering angle converges to the original value.

The integral value holding part 68 receives the selection signal from the selection part 24. When receiving the selection signal, the integral value holding part 68 stops update of the integral value included in I term of the FB control part 62 and holds the integral value to the value at the time of receiving the selection signal. The reason why the update of the integral value is stopped when the selection signal is received is that the integral value influences later control. By holding the integral value, a control result of the command steering angle tracking control based on the recalculated value is prevented from influencing controllability after return to the normal command steering angle tracking control. Holding of the integral value by the integral value holding part 68 is continued until the recalculated value of the command steering angle converges to the original value. Note that the integral value is held in the present embodiment, but the integral value may be reset when the selection signal is received.

4. Control Flow of Automatic Steering Control by Steering Control Apparatus

Figure 6:
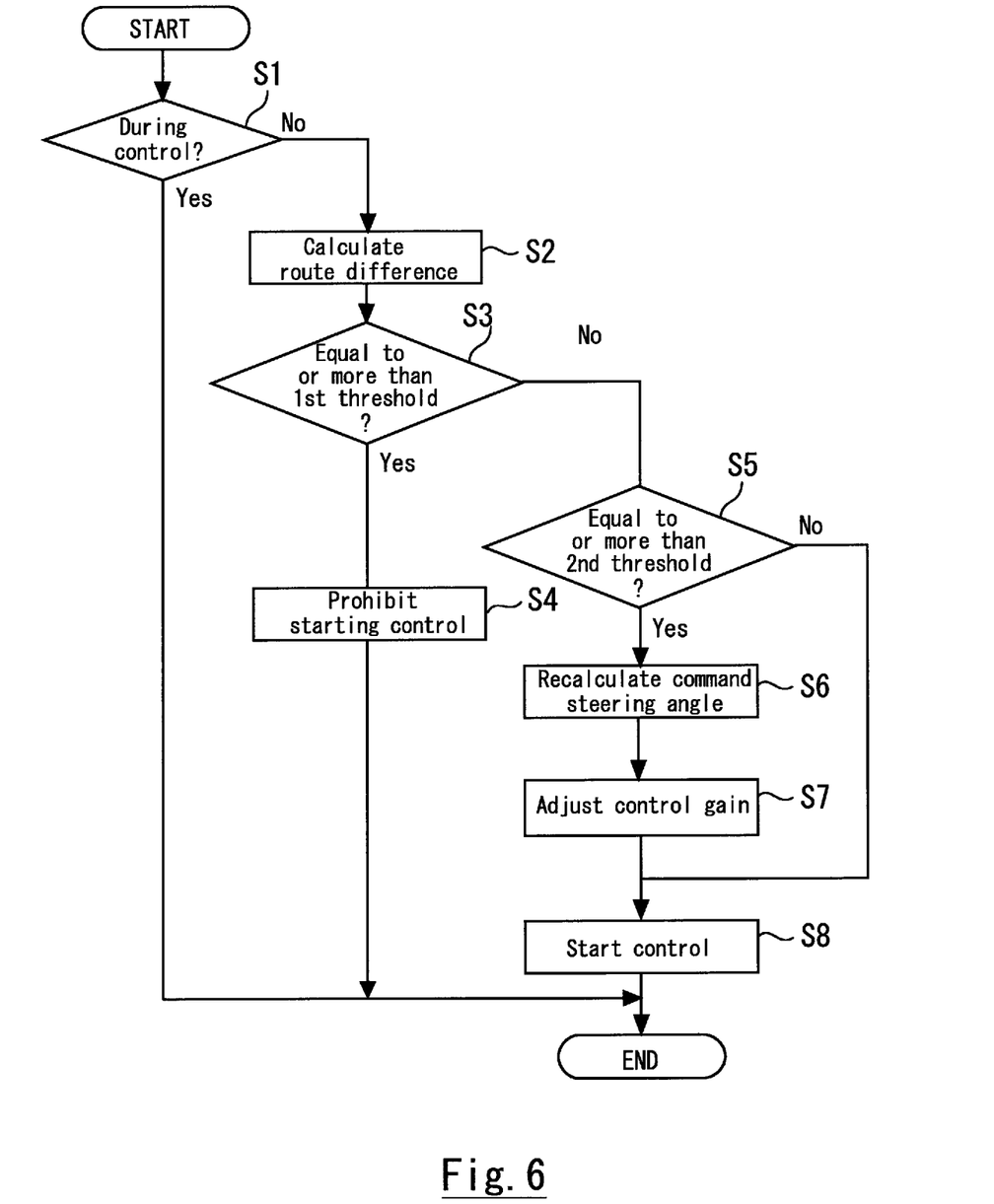
FIG. 6 is a flowchart illustrating control flow at the time of starting automatic steering control according to the embodiment.

By the steering control apparatus 20 that is configured as above, the automatic steering control is performed as part of the automatic drive. FIG. 6 is a flowchart illustrating control flow at the time of starting the automatic steering control by the steering control apparatus 20. The steering control apparatus 20 reads a program made based on this control flow from the memory and executes the program.

First, in step S1, it is determined whether or not the automatic steering control is being performed now. This control flow is finished when the automatic steering control is being already performed. On the other hand, this control flow advances to step S2 when the automatic steering control is not yet performed.

In step S2, the route difference (deviation degree) between the target traveling route and the current traveling route of the vehicle is calculated. Then, in step S3, it is determined whether or not the route difference calculated in step S2 is equal to or more than the first threshold. When the route difference is equal to or more than the first threshold, this control flow advances to step S4. The first threshold is an upper limit of the route difference where switching from the manual steering control to the automatic steering control is permitted. Therefore, in step S4, starting the automatic steering control is not permitted, and this control flow is finished.

When the route difference is determined to be smaller than the first threshold in step S3, a determination in step S5 is performed successively. In step S5, it is determined whether or not the route difference calculated in step S2 is equal to or more than the second threshold. When the route difference is equal to or more than the second threshold, the control flow advances to step S8 after processing step S6 and S7. In step S6, the recalculation of the command steering angle is performed. In step S7, the adjustment of the gain concerning the command steering angle tracking control, that is the FF gain and the FB gain is performed. Also, in addition to this processing, holding of the integral value included in the integral term of the FF command current is performed. After these processing, the automatic steering control using the command steering angle recalculated in step S6 is started in step S8.

When the route difference is determined to be smaller than the second threshold in step S3, step S6 and S7 are skipped. In this case, in step S8, the automatic steering control using the original value of the command steering angle is started.

5. Effects of Automatic Steering Control by Steering Control Apparatus

Figure 7:
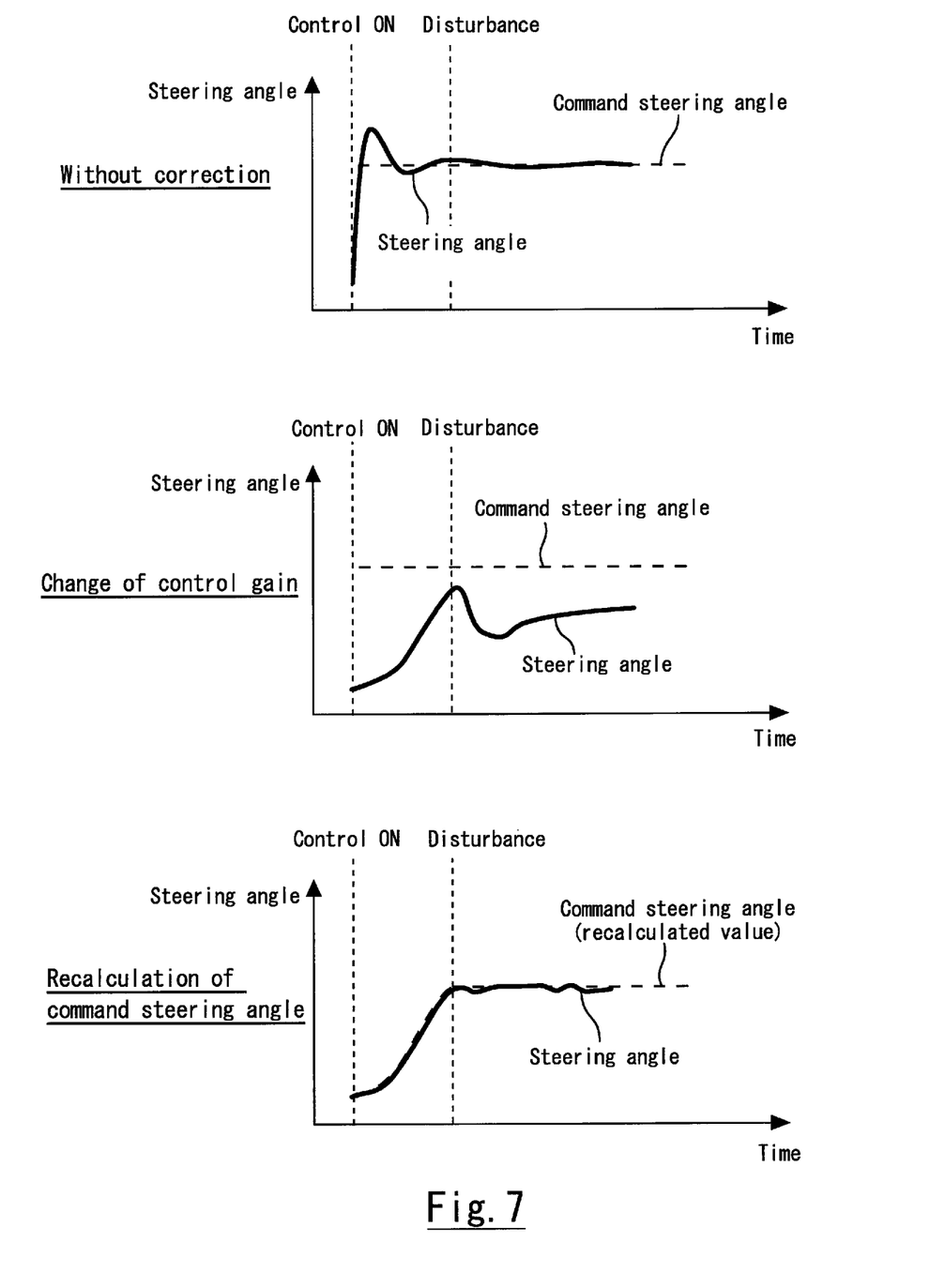
FIG. 7 is a view illustrating a control result of the automatic steering control according to the embodiment together with control results according to comparative examples.

FIG. 7 is a view illustrating a control result of the automatic steering control by the steering control apparatus 20 together with control results according to comparative examples. The top graph shows the control result by the first comparative example, the second top graph shows the control result by the second comparative example, and the bottom graph shows the control result of the automatic steering control by the steering control apparatus 20. In every graph, a change of the steering angle at the time when disturbance such as crosswinds acts on the vehicle after switching from the manual steering control to the automatic steering control is drawn with a solid line.

In the first comparative example, the command steering angle tracking control is performed based on the original value of the command steering angle after switching to the automatic steering control. As shown in the top graph, when the difference between the steering angle at the time of starting the control and the command steering angle is large, a sudden change of the steering angle is performed to eliminate the difference. By the sudden change of the steering angle, the traveling route of the vehicle converges to the target traveling route immediately, but disorder is produced in the vehicle behavior and the steering behavior.

In the second comparative example, the command steering angle tracking control is performed based on the original value of the command steering angle after switching to the automatic steering control. In addition, lowering the control gain concerning the command steering angle tracking control, that is the FF gain and the FB gain is also performed after switching to the automatic steering control. As shown in the second top graph, even if the difference between the steering angle at the time of starting the control and the command steering angle is large, the sudden change of the steering angle is suppressed because the control gain of the command steering angle tracking control is lowered. The steering angle gradually converges to the command steering angle, and thereby, the traveling route of the vehicle also gradually converges to the target traveling route. However, lowering the control gain of the command steering angle tracking control decreases a correction amount of a manipulated variable with respect to the disturbance that acts on the vehicle. That is, robustness to the disturbance decreases. Therefore, when the disturbance acts on the vehicle, the influence of the disturbance may cause the disorder of the vehicle behavior and the steering behavior as expressed by a variation of the steering angle illustrated in the graph.

According to the automatic steering control by the steering control apparatus 20, the recalculated value that gradually changes toward the original value of the command steering angle from the steering angle at the time of starting the control is used as the command steering angle for the command steering angle tracking control. Therefore, as shown in the bottom graph, the real steering angle after switching to the automatic steering control tracks the recalculated value of the command steering angle and gradually changes toward the original value. Also, even if the disturbance acts on the vehicle, correction of the steering angle by the command steering angle tracking control functions sufficiently, and thereby, the deviation of the steering angle from the command steering angle is suppressed. Accordingly, even if the disturbance acts on the vehicle, the traveling route of the vehicle converges gradually to the target traveling route, and the disorder of the vehicle behavior and the steering behavior is suppressed.

As described above, the steering control apparatus 20 according to the present embodiment, by performing the automatic steering control as above after switching from the manual steering control to the automatic steering control, can control the vehicle to track the target traveling route smoothly while suppressing the influence of the disturbance.

What is claimed is:

1. A steering control apparatus that is capable of switching steering control between manual steering control to make a driver operate a steering mechanism and automatic steering control to operate the steering mechanism automatically by a motor, the steering control apparatus comprising:
a processor programed to:
acquire a target traveling route;
calculate a command steering angle that eliminates a difference between a real traveling route of a vehicle and the target traveling route;
calculate an original value of the command steering angle that makes the real traveling route converge with the target traveling route using a constant response;
calculate a recalculated value of the command steering angle that changes gradually from a real steering angle after switching to the automatic steering control to the original value of the command steering angle based on (i) a steering angle at a time the automatic steering control is started and (ii) the original value of the command steering angle; and
perform command steering angle tracking control to drive the motor so that the real steering angle tracks the command steering angle during the automatic steering control, the command steering angle tracking control being performed with the recalculated value of the command steering angle until the recalculated value of the command steering angle converges with the original value of the command steering angle.

2. The steering control apparatus according to claim 1, wherein the processor is further programed to:
determine whether a deviation degree of a current traveling route of the vehicle with respect to the target traveling route is greater than or equal to a predetermined upper limit in response to a request to switch the steering control from the manual steering control to the automatic steering control; and
cancel the switching to the automatic steering control and continue the manual steering control in response to determining the deviation degree is greater than or equal to the predetermined upper limit.

3. The steering control apparatus according to claim 1, wherein the processor is further programed to calculate the recalculated value of the command steering angle by executing a filtering process or a rate limiter process on a difference between the steering angle at the time the automatic steering control is started and the original value of the command steering angle.

4. The steering control apparatus according to claim 1, wherein the processor is further programed to calculate the recalculated value of the command steering angle so that the real traveling route of the vehicle converges with the target traveling route within a predetermined period of time from the time the automatic steering control is started, while maintaining a vehicle behavior and a steering behavior within an allowable range.

5. The steering control apparatus according to claim 1, wherein the processor is further programed to adjust a gain of the command steering angle tracking control so as to raise trackability of the real steering angle with respect to the recalculated value of the command steering angle, when the recalculated value of the command steering angle is calculated.

6. The steering control apparatus according to claim 1, wherein the processor is further programed to stop an update of an integral value included in an integral term of the command steering angle tracking control or reset the integral value, when the recalculated value of the command steering angle used in the command steering angle tracking control is calculated.

7. A method for switching steering control between manual steering control to make a driver operate a steering mechanism and automatic steering control to operate the steering mechanism automatically by a motor, the method comprising:
acquiring a target traveling route;
calculating a command steering angle that eliminates a difference between a real traveling route of a vehicle and the target traveling route;
calculating an original value of the command steering angle that makes the real traveling route converge with the target traveling route using a constant response;
calculating a recalculated value of the command steering angle that changes gradually from a real steering angle after switching to the automatic steering control to the original value of the command steering angle based on (i) a steering angle at a time the automatic steering control is started and (ii) the original value of the command steering angle; and
performing command steering angle tracking control to drive the motor so that the real steering angle tracks the command steering angle during the automatic steering control, the command steering angle tracking control being performed with the recalculated value of the command steering angle until the recalculated value of the command steering angle converges with the original value of the command steering angle.

8. The method according to claim 7, further comprising:
determining whether a deviation degree of a current traveling route of the vehicle with respect to the target traveling route is greater than or equal to a predetermined upper limit in response to a request to switch the steering control from the manual steering control to the automatic steering control; and
canceling the switching to the automatic steering control and continuing the manual steering control in response to determining the deviation degree is greater than or equal to the predetermined upper limit.

9. The method according to claim 7, further comprising:
calculating the recalculated value of the command steering angle by executing a filtering process or a rate limiter process on a difference between the steering angle at the time the automatic steering control is started and the original value of the command steering angle.

10. The method according to claim 7, further comprising:
calculating the recalculated value of the command steering angle so that the real traveling route of the vehicle converges with the target traveling route within a predetermined period of time from the time the automatic steering control is started, while maintaining a vehicle behavior and a steering behavior within an allowable range.

11. The method according to claim 7, further comprising:
adjusting a gain of the command steering angle tracking control so as to raise trackability of the real steering angle with respect to the recalculated value of the command steering angle, when the recalculated value of the command steering angle is calculated.

12. The method according to claim 7, further comprising:
stopping an update of an integral value included in an integral term of the command steering angle tracking control or resetting the integral value, when the recalculated value of the command steering angle used in the command steering angle tracking control is calculated.

13. A non-transitory computer readable medium storing thereon a program causing a computer to execute a process for switching steering control between manual steering control to make a driver operate a steering mechanism and automatic steering control to operate the steering mechanism automatically by a motor, the process comprising:
acquiring a target traveling route;
calculating a command steering angle that eliminates a difference between a real traveling route of a vehicle and the target traveling route;
calculating an original value of the command steering angle that makes the real traveling route converge with the target traveling route using a constant response;
calculating a recalculated value of the command steering angle that changes gradually from a real steering angle after switching to the automatic steering control to the original value of the command steering angle based on (i) a steering angle at a time the automatic steering control is started and (ii) the original value of the command steering angle; and
performing command steering angle tracking control to drive the motor so that the real steering angle tracks the command steering angle during the automatic steering control, the command steering angle tracking control being performed with the recalculated value of the command steering angle until the recalculated value of the command steering angle converges with the original value of the command steering angle.

14. The non-transitory computer readable medium according to claim 13, wherein the process further comprises:
determining whether a deviation degree of a current traveling route of the vehicle with respect to the target traveling route is greater than or equal to a predetermined upper limit in response to a request to switch the steering control from the manual steering control to the automatic steering control; and
canceling the switching to the automatic steering control and continuing the manual steering control in response to determining the deviation degree is greater than or equal to the predetermined upper limit.

15. The non-transitory computer readable medium according to claim 13, wherein the process further comprises:
calculating the recalculated value of the command steering angle by executing a filtering process or a rate limiter process on a difference between the steering angle at the time the automatic steering control is started and the original value of the command steering angle.

16. The non-transitory computer readable medium according to claim 13, wherein the process further comprises:
calculating the recalculated value of the command steering angle so that the real traveling route of the vehicle converges with the target traveling route within a predetermined period of time from the time the automatic steering control is started, while maintaining a vehicle behavior and a steering behavior within an allowable range.

17. The non-transitory computer readable medium according to claim 13, wherein the process further comprises:
adjusting a gain of the command steering angle tracking control so as to raise trackability of the real steering angle with respect to the recalculated value of the command steering angle, when the recalculated value of the command steering angle is calculated.

18. The non-transitory computer readable medium according to claim 13, wherein the process further comprises:
stopping an update of an integral value included in an integral term of the command steering angle tracking control or resetting the integral value, when the recalculated value of the command steering angle used in the command steering angle tracking control is calculated.

* * * * *